US012776332B2

(12) United States Patent
Lee et al.

(10) Patent No.: US 12,776,332 B2
(45) Date of Patent: Oct. 27, 2026

(54) SYSTEM AND METHOD FOR MASK-BASED NEURAL BEAMFORMING FOR MULTI-CHANNEL SPEECH ENHANCEMENT

(71) Applicant: Samsung Electronics Co., Ltd., Suwon-si (KR)

(72) Inventors: Ching-Hua Lee, Mountain View, CA (US); Chou-Chang Yang, San Jose, CA (US); Yilin Shen, San Jose, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 18/457,921

(22) Filed: Aug. 29, 2023

(65) Prior Publication Data

US 2024/0331715 A1 Oct. 3, 2024

Related U.S. Application Data

(60) Provisional application No. 63/456,764, filed on Apr. 3, 2023.

(51) Int. Cl.
*G10L 21/0208* (2013.01)
*G10L 21/0224* (2013.01)
(Continued)

(52) U.S. Cl.
CPC ...... *G10L 21/0208* (2013.01); *G10L 21/0224* (2013.01); *G10L 21/0232* (2013.01); *G10L 2021/02166* (2013.01)

(58) Field of Classification Search
CPC ............. G10L 21/0208; G10L 21/0224; G10L 21/0232; G10L 2021/02166
See application file for complete search history.

(56) References Cited

U.S. PATENT DOCUMENTS 9,373,339 B2 * 6/2016 Thyssen .............. G10L 21/0208
10,186,278 B2 1/2019 Salishev
(Continued)

FOREIGN PATENT DOCUMENTS

CN 113571079 A 10/2021
CN 111816200 B 7/2022
(Continued)

OTHER PUBLICATIONS

Heymann, Jahn, Lukas Drude, and Reinhold Haeb-Umbach, "Neural network based spectral mask estimation for acoustic beamforming", Mar. 2016, 2016 IEEE International Conference on Acoustics, Speech and Signal Processing (ICASSP 2016), pp. 196-200. (Year: 2016).*

(Continued)

*Primary Examiner* — James Boggs

(57) ABSTRACT

A method includes receiving, during a first time window, a set of noisy audio signals from a plurality of audio input devices. The method also includes generating a noisy time-frequency representation based on the set of noisy audio signals. The method further includes providing the noisy time-frequency representation as an input to a mask estimation model trained to output a mask used to predict a clean time-frequency representation of clean speech audio from the noisy time-frequency representation. The method also includes determining beamforming filter weights based on the mask. The method further includes applying the beamforming filter weights to the noisy time-frequency representation to isolate the clean speech audio from the set of noisy audio signals. In addition, the method includes outputting the clean speech audio.

20 Claims, 9 Drawing Sheets

(51) Int. Cl.
*G10L 21/0232* (2013.01)
*G10L 21/0216* (2013.01)

(56) References Cited

U.S. PATENT DOCUMENTS

| | | | | |
|---|---|---|---|---|
| 10,262,675 | B2 | 4/2019 | Jensen | |
| 10,522,167 | B1 * | 12/2019 | Ayrapetian | G10L 17/18 |
| 10,573,301 | B2 * | 2/2020 | Kupryjanow | G10L 21/0232 |
| 10,672,414 | B2 * | 6/2020 | Tashev | G06N 3/045 |
| 10,726,856 | B2 | 7/2020 | Le Roux et al. | |
| 11,205,411 | B2 | 12/2021 | Hou | |
| 11,289,109 | B2 | 3/2022 | Deng et al. | |
| 11,380,307 | B2 | 7/2022 | Xu et al. | |
| 11,445,295 | B2 | 9/2022 | Chen et al. | |
| 11,508,388 | B1 * | 11/2022 | Souden | G06N 3/08 |
| 2020/0053486 | A1 | 2/2020 | Jensen | |
| 2024/0055012 | A1 * | 2/2024 | Wang | G10L 21/0224 |
| 2024/0177726 | A1 * | 5/2024 | Dai | G10L 21/0208 |
| 2024/0363131 | A1 * | 10/2024 | Dai | G10L 21/0208 |

FOREIGN PATENT DOCUMENTS

| | | | |
|---|---|---|---|
| WO | 2021071489 | A1 | 4/2021 |
| WO | 2023287773 | A1 | 1/2023 |

OTHER PUBLICATIONS

Chakrabarty, Soumitro, and Emanuël A. P. Habets, "Time-Frequency Masking Based Online Multi-Channel Speech Enhancement with Convolutional Recurrent Neural Networks", Aug. 2019, IEEE Journal of Selected Topics in Signal Processing, vol. 13, No. 4, pp. 787-799. (Year: 2019).*

Wilson, Kevin, Michael Chinen, Jeremy Thorpe, Brian Patton, John Hershey, Rif A. Saurous, Jan Skoglund, and Richard F. Lyon, "Exploring tradeoffs in models for low-latency speech enhancement", Sep. 2018, 2018 16th International Workshop on Acoustic Signal Enhancement (IWAENC 2018), pp. 366-370. (Year: 2018).*

Choi, Hyeong-Seok, Jang-Hyun Kim, Jaesung Huh, Adrian Kim, Jung-Woo Ha, and Kyogu Lee, "Phase-aware Speech Enhancement with Deep Complex U-Net", Mar. 2019, arXiv preprint arXiv:1903.03107, pp. 1-20. (Year: 2019).*

Xue, Cheng, Weilong Huang, Weiguang Chen, and Jinwei Feng, "Real-Time Multi-Channel Speech Enhancement Based on Neural Network Masking with Attention Model", Aug. 2021, Interspeech 2021, pp. 1862-1866. (Year: 2021).*

Li, Xiaofei, and Radu Horaud, "Multichannel Speech Enhancement Based on Time-frequency Masking Using Subband Long Short-Term Memory", Oct. 2019, IEEE Workshop on Applications of Signal Processing to Audio and Acoustics, pp. 298-302. (Year: 2019).*

Wang, Zhong-Qiu, and DeLiang Wang, "All-Neural Multi-Channel Speech Enhancement", Sep. 2018, Interspeech 2018, pp. 3234-3238. (Year: 2018).*

Liu, Yuzhou, Anshuman Ganguly, Krishna Kamath, and Trausti Kristjansson, "Neural network based time-frequency masking and steering vector estimation for two-channel MVDR beamforming", Apr. 2018, IEEE International Conference on Acoustics, Speech and Signal Processing (ICASSP 2018), pp. 6717-6721. (Year: 2018).*

Braun, Sebastian, and Ivan Tashev, "A consolidated view of loss functions for supervised deep learning-based speech enhancement", Sep. 2020, arXiv preprint arXiv:2009.12286. (Year: 2020).*

Zhou, Jing, Changchun Bao, Xu Zhang, Wenmeng Xiong, and Maoshen Jia, "Design of a robust MVDR beamforming method with Low-Latency by reconstructing covariance matrix for speech enhancement", Jun. 2023, Applied Acoustics 211 (2023) 109464, pp. 1-16. (Year: 2023).*

Nie, Shuai, Shan Liang, Zhanlei Yang, Longshuai Xiao, Wenju Liu, and Jianhua Tao, "Masking-based Neural Beamformer for Multichannel Speech Enhancement", Dec. 2022, 2022 13th International Symposium on Chinese Spoken Language Processing (ISCSLP), pp. 125-129. (Year: 2022).*

Lee, Ching-Hua, Kashyap Patel, Chouchang Yang, Yilin Shen, and Hongxia Jin, "An MVDR-embedded U-Net beamformer for effective and robust multichannel speech enhancement", Apr. 2024, ICASSP 2024-2024 IEEE International Conference on Acoustics, Speech and Signal Processing (ICASSP 2024), pp. 8541-8545. (Year: 2024).*

Parchami, Mahdi, Wei-Ping Zhu, and Benoit Champagne, "A New Algorithm for Noise PSD Matrix Estimation in Multi-Microphone Speech Enhancement Based on Recursive Smoothing", May 2015, 2015 IEEE International Symposium on Circuits and Systems (ISCAS), pp. 429-432. (Year: 2015).*

Yi Luo, et al., "Conv-TasNet: Surpassing Ideal Time-Frequency Magnitude Masking for Speech Separation," IEEE/ACM Transactions on Audio, Speech, and Language Processing, vol. 27, No. 8, Aug. 2019, pp. 1256-1266.

Hyeong-Seok Choi, et al., "Phase-Aware Speech Enhancement with Deep Complex U-Net," ICLR 2019 International Conference on Learning Representations, New Orleans, Louisiana, May 6-9, 2019, 20 pages.

Yi Luo, et al., "End-to-end Microphone Permutation and Number Invariant Multi-channel Speech Separation," ICASSP 2020—2020 IEEE International Conference on Acoustics, Speech and Signal Processing (ICASSP), Barcelona, Spain, May 4-8, 2020, pp. 6394-6398.

Ching-Hua Lee, et al., "Improved Mask-Based Neural Beamforming for Multichannel Speech Enhancement by Snapshot Matching Masking," ICASSP 2023—2023 IEEE International Conference on Acoustics, Speech and Signal Processing (ICASSP), Rhodes Island, Greece, Jun. 4-10, 2023, pp. 1-5.

Supplementary European Search Report dated Jan. 21, 2025, in connection with European Patent Application No. 24729169.3, 11 pages.

Chakrabarty et al., "Time-Frequency Masking Based Online Multi-Channel Speech Enhancement With Convolutional Recurrent Neural Networks," IEEE Journal of Selected Topics in Signal Processing, vol. 13, No. 4, Aug. 2019, 13 pages.

International Search Report and Written Opinion of the International Searching Authority dated Jun. 19, 2024, in connection with International Application No. PCT/KR2024/003221, 7 pages.

Office Action dated Nov. 17, 2025, in connection with European Patent Application No. 24 729 169.3, 9 pages.

Heymann et al., "BLSTM Supported GEV Beamformer Front-End for the 3rd Chime Challenge," ASRU 2015, 8 pages.

* cited by examiner

SYSTEM AND METHOD FOR MASK-BASED NEURAL BEAMFORMING FOR MULTI-CHANNEL SPEECH ENHANCEMENT

CROSS-REFERENCE TO RELATED APPLICATION AND PRIORITY CLAIM

This application claims priority under 35 U.S.C. § 119(e) to U.S. Provisional Patent Application No. 63/456,764 filed on Apr. 3, 2023, which is hereby incorporated by reference in its entirety.

TECHNICAL FIELD

This disclosure relates generally to machine learning systems. More specifically, this disclosure relates to a system and method for mask-based neural beamforming for multi-channel speech enhancement.

BACKGROUND

Communications between users or interactions with smart assistants using electronic devices, such as mobile devices, wearable devices, and smart home appliance devices, have become increasingly commonplace. Often times, these communications or interactions involve the use of various voice user interfaces driven by systems such as automatic speech recognition, keyword spotting, etc. However, surrounding noise and interference in real-world environments create issues in properly understanding voice inputs. For example, speech quality degrades drastically in noisy environments, causing crucial information to be lost at the receiver side (the human ear or smart assistants).

SUMMARY

This disclosure relates to a system and method for mask-based neural beamforming for multi-channel speech enhancement.

In a first embodiment, a method includes receiving, during a first time window, a set of noisy audio signals from a plurality of audio input devices. The method also includes generating a noisy time-frequency representation based on the set of noisy audio signals. The method further includes providing the noisy time-frequency representation as an input to a mask estimation model trained to output a mask used to predict a clean time-frequency representation of clean speech audio from the noisy time-frequency representation. The method also includes determining beamforming filter weights based on the mask. The method further includes applying the beamforming filter weights to the noisy time-frequency representation to isolate the clean speech audio from the set of noisy audio signals. In addition, the method includes outputting the clean speech audio.

In a second embodiment, an electronic device includes at least one processing device configured to receive, during a first time window, a set of noisy audio signals from a plurality of audio input devices. The at least one processing device is also configured to generate a noisy time-frequency representation based on the set of noisy audio signals. The at least one processing device is further configured to provide the noisy time-frequency representation as an input to a mask estimation model trained to output a mask used to predict a clean time-frequency representation of clean speech audio from the noisy time-frequency representation. The at least one processing device is also configured to determine beamforming filter weights based on the mask.

The at least one processing device is further configured to apply the beamforming filter weights to the noisy time-frequency representation to isolate the clean speech audio from the set of noisy audio signals. In addition, the at least one processing device is configured to output the clean speech audio.

In a third embodiment, a non-transitory machine-readable medium contains instructions that when executed cause at least one processor of an electronic device to receive, during a first time window, a set of noisy audio signals from a plurality of audio input devices. The non-transitory machine-readable medium also contains instructions that when executed cause the at least one processor to generate a noisy time-frequency representation based on the set of noisy audio signals. The non-transitory machine-readable medium further contains instructions that when executed cause the at least one processor to provide the noisy time-frequency representation as an input to a mask estimation model trained to output a mask used to predict a clean time-frequency representation of clean speech audio from the noisy time-frequency representation. The non-transitory machine-readable medium also contains instructions that when executed cause the at least one processor to determine beamforming filter weights based on the mask. The non-transitory machine-readable medium further contains instructions that when executed cause the at least one processor to apply the beamforming filter weights to the noisy time-frequency representation to isolate the clean speech audio from the set of noisy audio signals. In addition, the non-transitory machine-readable medium also contains instructions that when executed cause the at least one processor to output the clean speech audio.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B." "at least one of A and/or B." or "one or more of A and/or B" may include all possible combinations of A and B. For example, "A or B." "at least one of A and B." and "at least one of A or B" may indicate all of (1) including at least one A. (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for." "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
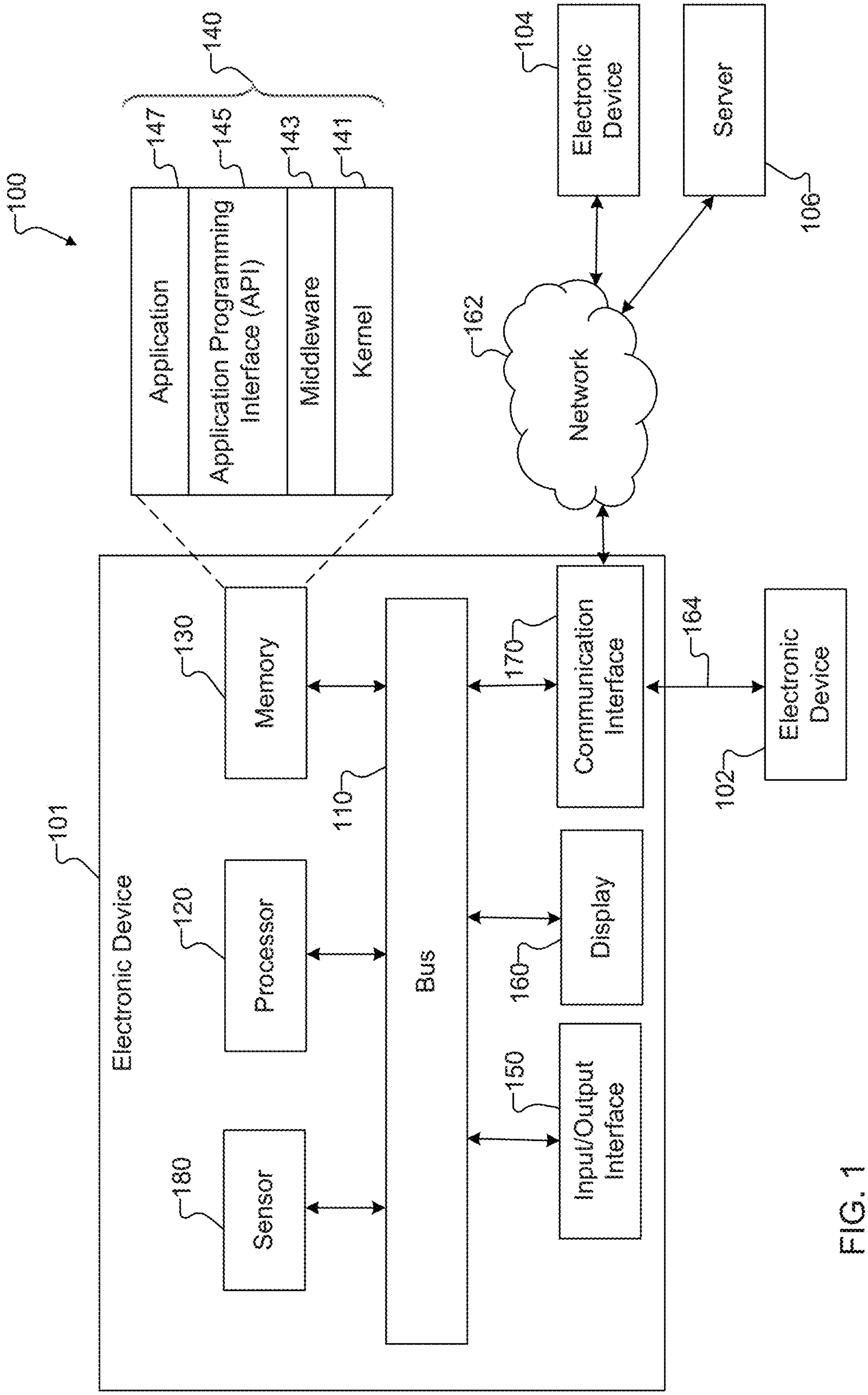
FIG. 1 illustrates an example network configuration including an electronic device in accordance with this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, communications between users or interactions with smart assistants using electronic devices, such as mobile devices, wearable devices, and smart home appliance devices, have become increasingly commonplace. Often times, these communications or interactions involve the use of various voice user interfaces driven by systems such as automatic speech recognition, keyword spotting, etc. However, surrounding noise and interference in real-world environments create issues in properly understanding voice inputs. For example, speech quality degrades drastically in noisy environments, causing crucial information to be lost at the receiver side (the human ear or smart assistants).

Speech enhancement (SE) systems have tried to mitigate this problem by combining multiple microphone sensor signals in order to suppress background noise via spatial filtering or beamforming. These speech enhancement systems are often front-end modules that pre-process incoming audio streams, and these systems typically need to be run in very low power computation and limited memory devices and platforms where minimal resource consumption is desired.

Deep learning-based algorithms have been developed for boosting beamforming performance, but existing approaches have not satisfactorily solved the speech denoising problem, especially in limited resource environments. Existing techniques that employ deep learning-based and purely data-driven solutions, such as Filter-and-Sum Network (FaSNet) techniques, train speech denoising models in an end-to-end manner, which typically requires a large modeling capacity for appropriately learning noisy-to-clean signal mappings from training data. However, such networks are less suitable for deployment on memory and power constrained devices as they would require substantial GPU/CPU usage. Moreover, straightforward model size reduction is not feasible because small networks will struggle to learn such complicated noisy-clean signal mappings without specialized designs. Existing techniques that employ model-based signal processing and deep learning (data-driven) hybrid solutions use deep neural networks (DNNs) to assist signal processing-based beamforming algorithms, where signal and noise properties are mathematically modeled to approach a solution. These hybrid approaches exploit prior knowledge of signal statistics to achieve smaller model sizes than pure deep learning approaches. However, these approaches train the DNNs to estimate pre-defined ideal masks that are not based on multichannel characteristics but on single-channel speech enhancement solutions, such as estimating an ideal binary mask (IBM) or an ideal ratio mask (IRM). These pre-defined ideal masks lack a direct connection to multichannel power spectral density (PSD) estimation for deriving beamforming weights. That is, these pre-defined masks do not directly target minimization of an estimated signal PSD matrix to a true PSD, so their performance is non-optimal.

This disclosure provides systems and methods for enhanced mask-based multichannel speech enhancement performance using improved masking strategies, learning protocols, and PSD estimation schemes to more efficiently exploit multichannel signal characteristics for improved beamforming. Among other things, this disclosure provides an efficient machine learning-based multichannel speech enhancement system that can be applicable to resource-constrained devices and that can leverage DNN approaches to assist model-based statistical beamformers in pursuing better denoising performance. The systems and methods of this disclosure overcome the previously-described issues and facilitate deployment on edge devices while obtaining satisfactory noise suppression performance by using a novel time frequency (T-F) masking framework based on a mask estimation network or model that estimates a snapshot matching mask, a training processes that uses a snapshot matching loss to train the mask estimation network or model, and a magnitude-bounded complex-valued masking constraint that bounds the mask magnitude within a search space.

The speech enhancement systems and methods of this disclosure allow for the receipt of noisy audio signals from a plurality of audio input devices. The noisy audio signals can be transformed into noisy time-frequency representations using a time-frequency operation. The noisy time-frequency representations are provided to a mask estimation model, which is trained to output a mask used to predict a clean time-frequency representation of clean speech audio from the set of noisy audio signals. The mask that is output by the mask estimation model is used to determine beamforming filter weights for denoising the audio signals. The determined beamforming filter weights are applied to the noisy time-frequency representation to isolate the clean speech audio from the set of noisy audio signals, and an enhanced or clean speech audio signal can be output for further processing.

Note that while some of the embodiments discussed below are described in the context of use in consumer electronic devices (such as smartphones), this is merely one example. It will be understood that the principles of this disclosure may be implemented in any number of other suitable contexts and may use any suitable device or devices. Also note that while some of the embodiments discussed below are described based on the assumption that one device (such as a server) performs training of a machine learning model that is deployed to one or more other devices (such as one or more consumer electronic devices), this is also merely one example. It will be understood that the principles of this disclosure may be implemented using any number of devices, including a single device that both trains and uses a machine learning model. In general, this disclosure is not limited to use with any specific type(s) of device(s).

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to mask-based neural beamforming for multi-channel speech enhancement. For example, as described below, the processor 120 may receive and process inputs (such as audio inputs or data received from one or more audio input devices like one or more microphones) and perform speech enhancement tasks using one or more machine learning models and the inputs. The processor 120 may also instruct one or more other devices to perform certain operations (such as outputting audio using one or more audio output devices like one or more speakers) or display content on one or more displays 160. The processor 120 may further receive inputs (such as data samples to be used in training one or more machine learning models) and manage such training by inputting the samples to the machine learning model(s), receive outputs from the machine learning model(s), and execute learning functions (such as loss functions) to improve the machine learning model(s).

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to mask-based neural beamforming for multi-channel speech enhancement. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more microphones or other audio sensors for capturing audio data or one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For instance, the server 106 can include a processing module or processor that may support the processor 120 implemented in the electronic device 101. As described in more detail below, the server 106 may perform various operations related to mask-based neural beamforming for multi-channel speech enhancement. For example, as described below, the server 106 may receive and process inputs (such as audio inputs or data received from one or more audio input devices like one or more microphones) and perform speech enhancement tasks using one or more machine learning models and the inputs. The server 106 may also instruct one or more other devices to perform certain operations (such as outputting audio using one or more audio output devices like one or more speakers) or display content on one or more displays 160. The server 106 may further receive inputs (such as data samples to be used in training one or more machine learning models) and manage such training by inputting the samples to the machine learning model(s), receive outputs from the machine learning model(s), and execute learning functions (such as loss functions) to improve the machine learning model(s).

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
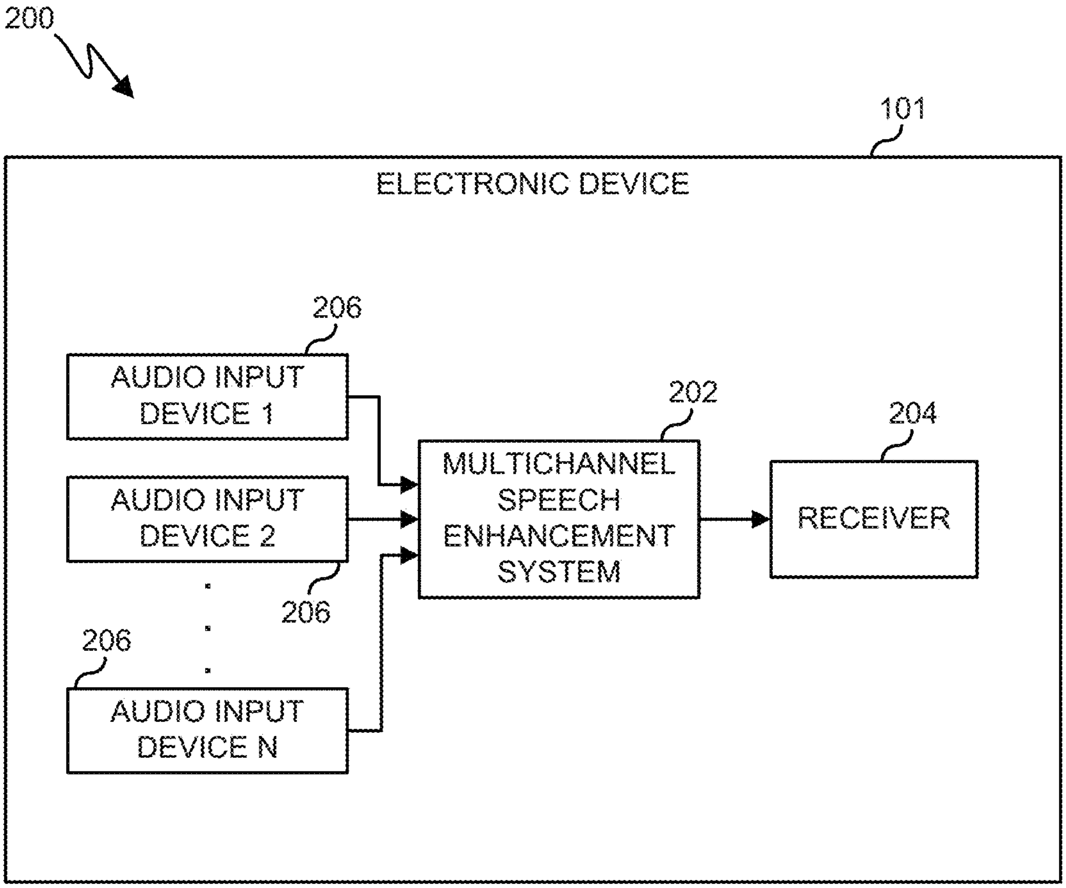
FIG. 2 illustrates an example speech enhancement system in accordance with this disclosure.

FIG. 2 illustrates an example speech enhancement system 200 in accordance with this disclosure. For ease of explanation, the system 200 is described as involving the use of the electronic device 101 in the network configuration 100 of FIG. 1. However, the system 200 may be used with any other suitable electronic device(s), such as the server 106, and in any other suitable system(s).

As shown in FIG. 2, the speech enhancement system 200 can be deployed on and executed by an electronic device, such as electronic device 101. The electronic device 101 includes a multichannel speech enhancement system 202, a receiver 204, and a plurality of audio input devices 206 (such as microphones). Audio inputs are captured by the audio input devices 206 and provided as inputs to the multichannel speech enhancement system 202. The multichannel speech enhancement system 202 is configured to receive audio signals including speech that may have a certain level of noise or interference caused by a noisy environment in which the electronic device 101 operates. As described in more detail below, the multichannel speech enhancement system 202 performs various operations on the noisy multichannel audio data, such as by performing time-frequency analysis on the audio data, estimating a snapshot matching mask, determining beamforming weights using the snapshot matching mask, applying the beamforming weights to the noisy audio inputs in order to denoise the audio signals and create enhanced audio signals, and convert the enhanced audio signals back to a time domain.

The multichannel speech enhancement system 202 outputs the enhanced audio signals to the receiver 204. The receiver 204 can be, for example, a receiving audio output device (such as a speaker) that outputs the enhanced audio signals to a user, or a smart assistant that receives the enhanced audio signals for further processing like performing wake word detection, automated speech recognition (ASR) tasks, and/or other associated operations of the electronic device, etc. It will be understood that enhanced audio signals created using the multichannel speech enhancement system 202 and the processes described in this disclosure could be used for various other purposes.

Although FIG. 2 illustrates one example of a speech enhancement system 200, various changes may be made to FIG. 2. For example, the receiver 204 and the audio input devices 206 can be connected to a processor (such as the processor 120) within the electronic device 101, such as via wired connections or circuitry. In some embodiments, the receiver 204 and the audio input devices 206 can be external to the electronic device 101 and connected via wired or wireless connections. Also, in some embodiments, the multichannel speech enhancement system 202 can be stored remotely from the electronic device 101, such as on the server 106. Here, the electronic device 101 can transmit requests including inputs (such as captured audio data) to the server 106 for processing of the inputs using the multichannel speech enhancement system 202, and the results can be sent back to the electronic device 101. In other embodiments, the electronic device 101 can be the server 106, which receives audio inputs from a client device and transmits instructions back to the client device to execute functions associated with instructions included in utterances.

Figure 3:
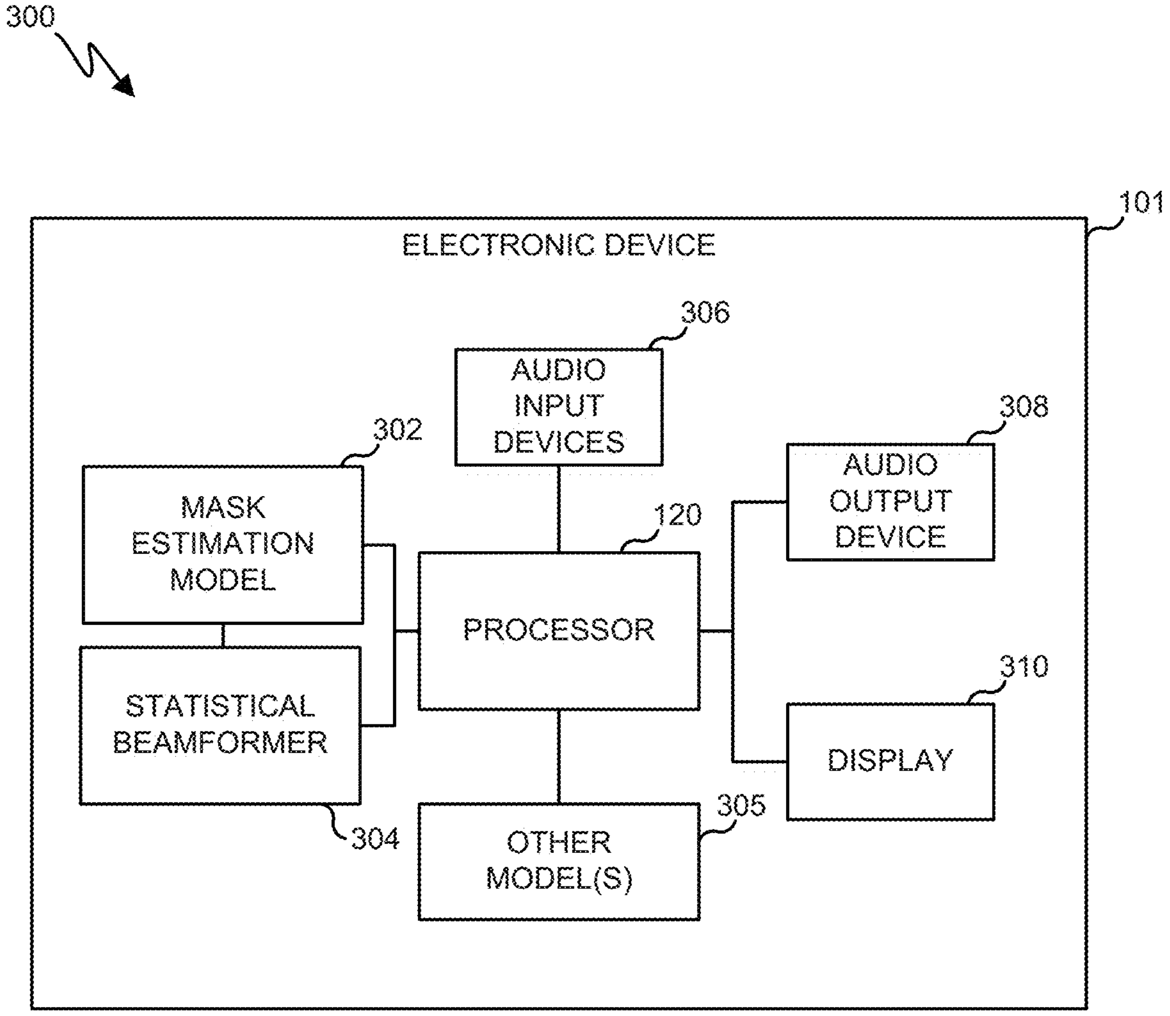
FIG. 3 illustrates another example speech enhancement system in accordance with this disclosure.

FIG. 3 illustrates another example speech enhancement system 300 in accordance with this disclosure. For case of explanation, the system 300 is described as involving the use of the electronic device 101 in the network configuration 100 of FIG. 1. However, the system 300 may be used with any other suitable electronic device(s), such as the server 106, and in any other suitable system(s).

As shown in FIG. 3, the system 300 includes the electronic device 101, which includes the processor 120. The processor 120 is operatively coupled to or otherwise configured to use one or more machine learning models, such as a mask estimation model 302. The mask estimation model 302 can be trained to predict a snapshot matching mask (SMM) from noisy audio signals received via multichannel audio input devices 306 (such as microphones). The SMM is used to reduce or minimize distances between predicted signal snapshots and true signal snapshots during training, leading to a more systematic method of estimating speech and noise power spectral density (PSD) matrices that are used to derive beamformer weights during inferencing.

The system 300 also includes a statistical beamformer 304, which includes PSD matrices that are updated during inferencing based on the SMM. The processor 120 can apply these updated beamformer weights to noisy audio signals in order to suppress noise within the noisy audio signals and to provide enhanced audio signals for further use by the electronic device 101 or other device. In some cases, the mask estimation model 302 and the statistical beamformer 304 may represent at least a portion of the multichannel speech enhancement system 202 described above with respect to FIG. 2.

The processor 120 can also be operatively coupled to or otherwise configured to use one or more other models 305, such as one or more models related to voice assistants or other processes like one or more ASR models and/or one or more natural language understanding (NLU) models. It will be understood that the machine learning models 302-305 can be stored in a memory of the electronic device 101 (such as the memory 130) and accessed by the processor 120 to perform multichannel speech enhancement and/or other tasks. However, the machine learning models 302-305 can be stored in any other suitable manner.

The system 300 also includes an audio output device 308 (such as a speaker or headphones) and a display 310 (such as a screen or a monitor like the display 160). The processor 120 provides output enhanced audio signals, provided by the statistical beamformer 304 using the predicted SMM, to a receiver (such as the audio output device 308 or one or more of the other models 305). For example, the enhanced or clean audio signals can be output via the audio output device 308 to provide a clearer audio output to users. As another example, the clean audio signals can be provided to a smart assistant for further audio/language processing, such as by using the one or more other models 305 to perform one or more tasks such as wake word detection, ASR, NLU, etc. and/or other associated operations of the electronic device 101.

As a particular example, based on clean audio signals, the processor 120 may instruct one or more further actions that correspond to one or more instructions or requests provided in an utterance included in the clean audio signals. For instance, suppose an utterance is received from a user via the audio input devices 306 (such as "hey BIXBY, call mom") as noisy audio signals. Here, the trained mask estimation model 302 and the statistical beamformer 304 are used to denoise the audio signals and provide enhanced audio signals that allow for increased speech detection accuracy by a voice assistant using the other models 305. Based on this utterance, the processor 120 can instruct the audio output device 308 to output "calling Mom," and the processor 120 can cause a phone application or other communication application to begin a communication session with a "mom" contact stored on the electronic device 101 or otherwise in association with the user of the electronic device 101. As another example, suppose an utterance of "hey BIXBY, start a timer" is received. Here, the mask estimation model 302 and the statistical beamformer 304 are used to denoise the audio signals so that a voice assistant using the other models 305 can perform accurate speech detection, and the processor 120 may instruct execution of a timer application and display of a timer on the display 310 of the electronic device 101.

Although FIG. 3 illustrates another example of a speech enhancement system 300, various changes may be made to FIG. 3. For example, the audio input devices 306, the audio output device 308, and the display 310 can be connected to the processor 120 within the electronic device 101, such as via wired connections or circuitry. In other embodiments, the audio input devices 306, the audio output device 308, and the display 310 can be external to the electronic device 101 and connected via wired or wireless connections. Further, in some embodiments, one or more models, including the mask estimation model 302, the statistical beamformer 304, and the other models 305, can be stored remotely from the electronic device 101, such as on the server 106. Here, the electronic device 101 can transmit requests including inputs (such as captured audio data) to the server 106 for processing of the inputs using the mask estimation model 302 and the statistical beamformer 304, and the results can be sent back to the electronic device 101. In other embodiments, the electronic device 101 can be the server 106, which receives audio inputs from a client device and transmits instructions back to the client device to execute functions associated with instructions included in utterances. In addition, in some cases, the mask estimation model 302 and the statistical beamformer 304, as well as one or more of the other machine learning models 305, can be stored as separate models called upon by the processor 120 to perform certain tasks or can be included in and form a part of one or more larger machine learning models.

Figure 4:
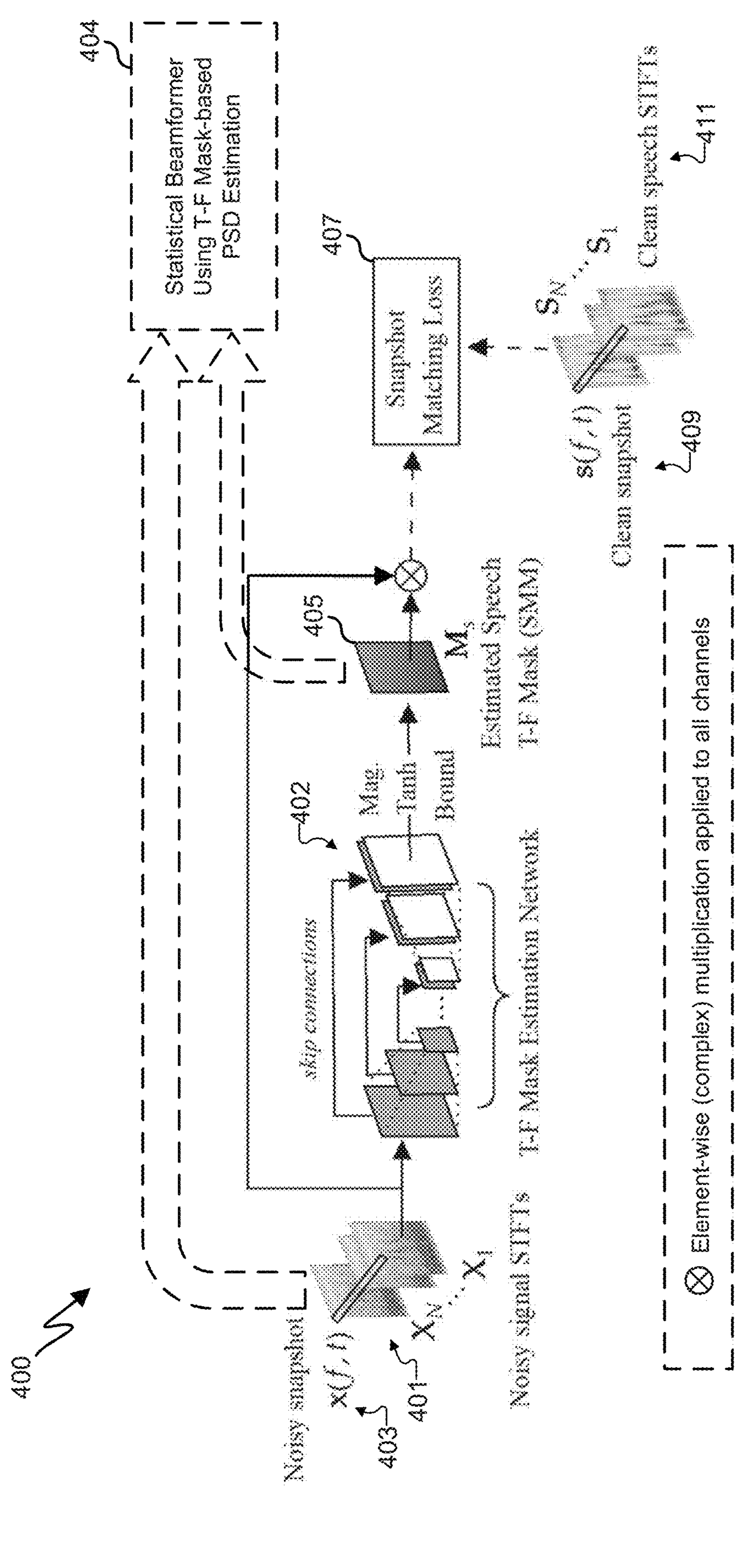
FIG. 4 illustrates an example multichannel speech enhancement architecture in accordance with this disclosure.

FIG. 4 illustrates an example multichannel speech enhancement architecture 400 in accordance with this disclosure. For case of explanation, the architecture 400 shown in FIG. 4 is described as being implemented on or supported by the server 106 in the network configuration 100 of FIG. 1. However, the architecture 400 shown in FIG. 4 could be used with any other suitable device(s) and in any other suitable system(s), such as when at least a portion of the architecture 400 is implemented on or supported by the electronic device 101.

As shown in FIG. 4, the architecture 400 includes a mask estimation network 402, which in some cases may represent the mask estimation model 302 described above with respect to FIG. 3. The mask estimation network 402 receives as inputs noisy time-frequency representations generated by performing a time-frequency operation on noisy audio signals received via a plurality of audio input devices, such as a short-time Fourier transform, MelSpectrogram, Mel Frequency Cepstral Coefficient (MFCC), and/or other methods. As a result, the noisy audio signals received via the audio input devices as time-domain waveforms are transformed into complex x-valued spectrograms. In various embodiments, an additive noise model may be used. For instance, let f and t respectively represent a frequency index and a time frame index (with a total of F bins and T frames), where the $i^{th}$ noisy signal T-F transform $X_i(f,t)$ of an N-microphone array can be expressed as follows.

$$X_i(f, t) = S_i(f, t) + V_i(f, t), \tag{1}$$

Here, ∀f, t, where $S_i(f,t)$ and $V_i(f,t)$ are speech and noise components, respectively, received by the $i^{th}$ microphone.

In the example shown in FIG. 4, noisy audio signals are converted to the time-frequency domain using a short-time Fourier transform, and the mask estimation network 402 receives a plurality of noisy signal short-time Fourier transforms (STFTs) 401 resulting from the transformations. In some cases, the noisy signal STFTs 401 can be provided as inputs in the form of at least one vector of microphone signals, such as a noisy signal snapshot 403 (x(f,t)). As a particular example, the noisy signal snapshot 403 may be expressed as follows.

$$x(f, t) = [X_1(f, t), \dots , X_N(f, t)]^T \in \mathbb{C}^N \tag{2}$$

In some embodiments, the mask estimation network 402 can be a deep neural network (DNN) model. The mask estimation network 402 can include a plurality of complex convolutional layers that are used to perform a number of convolutions to downsample and upsample input data. Also, in some embodiments, complex leaky rectified linear unit (ReLU) operations can be performed as an activation function in the DNN model. The mask estimation network 402, using the noisy input signal STFTs 401, estimates a T-F mask 405(M), referred to in this disclosure as a snapshot matching mask (SMM). When the mask estimation network 402 is implemented using or includes a DNN model, any suitable DNN model may be used, such as a complex U-NET model. As a particular example, various techniques described in this disclosure may be used in conjunction with the techniques described in Lee et al., "Improved Mask-Based Neural Beamforming for Multichannel Speech Enhancement by Snapshot Matching Masking," IEEE International Conference on Acoustics, Speech and Signal Processing (ICASSP), June 2023 (available at https://iecexplore.ieee.org/document/10096213), which is hereby incorporated by reference in its entirety.

Figure 5:
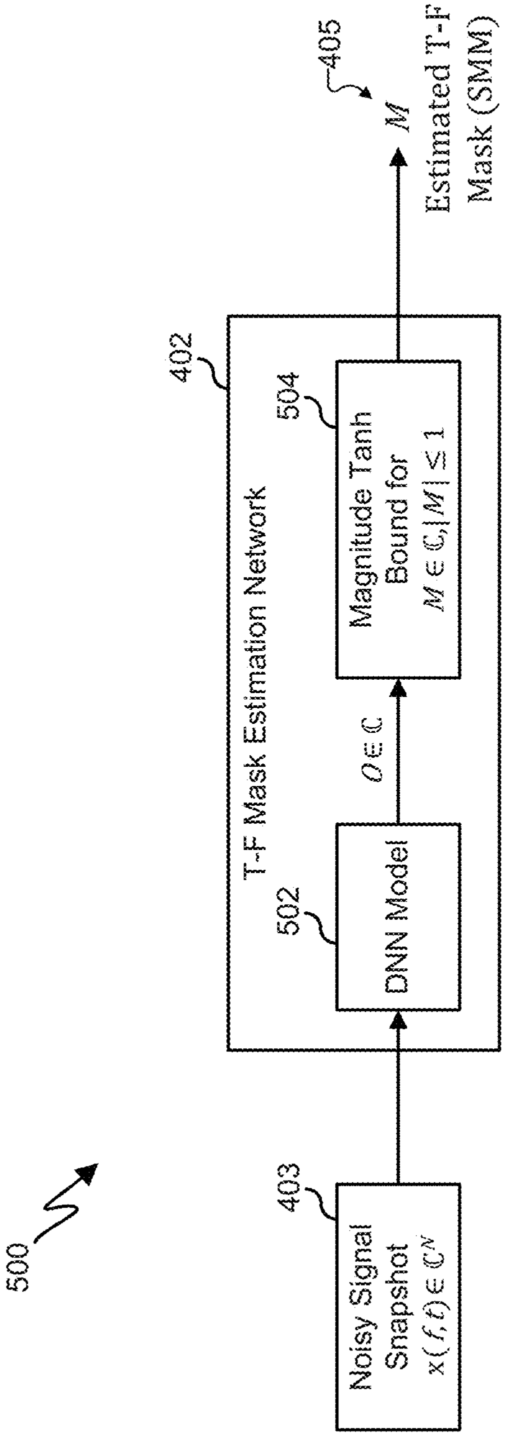
FIG. 5 illustrates an example snapshot matching mask estimation process in accordance with this disclosure.

As shown in FIG. 4, the search space can be constrained, such as by using Tanh nonlinearity, to bound the magnitude of the output of the final layer of the mask estimation network 402. Referring also to FIG. 5, which illustrates an example snapshot matching mask estimation process 500 in accordance with this disclosure, there is shown a more detailed view of the mask estimation network 402. As shown in FIG. 5, the mask estimation network 402 includes a main DNN model 502, which may correspond to the structure of the mask estimation network 402 illustrated in FIG. 4, and a magnitude Tanh bound operation 504. In this embodiment, the SMM 405 is configured to estimate how likely the input audio includes speech, where a value closer to one indicates the audio likely includes speech and a value closer to zero indicates the audio likely does not include speech. This can be expressed as follows.

$$M \in \mathbb{C}, |M| \leq 1 \tag{3}$$

In various embodiments, the magnitude Tanh bound operation 504 is a nonlinear module imposed on the DNN output O to bound its magnitude within a unit circle on a complex plane, such as to ensure its magnitude is less than or equal to one. As noted above, the magnitude of the mask can thus be intuitively interpreted as a speech presence probability (SPP) to indicate the likelihood that a speech component is present in each T-F bin, where the probability ranges from zero to one and can be reflected by the magnitude of less than or equal to one. The magnitude Tanh bound operation 504 imposes a Tanh nonlinearity on the magnitude of the network output while keeping the phase unaltered. Incorporating a magnitude-bounded complex-valued masking constraint for the output SMM 405(M) to explore the complex domain representation provides increased modeling flexibility while also casing optimization difficulty by bounding the mask magnitude within a suitable search space. This is because incorporating the magnitude Tanh bound operation 504 avoids challenges in optimizing from an infinite unbounded search space, which is especially helpful when dealing with multichannel data (since that data is more complicated than single-channel data). Compared to existing masking approaches such as the ideal binary mask (IBM) and the ideal ratio mask (IRM), the SMM adopts a complex-valued representation. Thus, the SMM can also manipulate phase components of signal snapshots to better exploit spatial characteristics of multichannel signals, compared to IBM and IRM that utilize real-valued masks.

Although FIG. 5 illustrates one example of a snapshot matching mask estimation process 500, various changes may be made to FIG. 5. For example, various components and functions in FIG. 5 may be combined, further subdivided, rearranged, replicated, or omitted according to particular needs. Also, one or more additional components and functions may be included if needed or desired.

Referring again to FIG. 4, during training, the SMM 405 is used to reduce or minimize the distances between estimated signal snapshots and clean signal snapshots 409 (s(f,t)), providing a systematic method of estimating speech and noise power spectral density (PSD) matrices that are used to derive beamformer weights during inferencing. In some cases, the clean signal snapshots 409 can be expressed as follows.

$$s(f,t) = [S_1(f,t), \ldots, S_N(f,t)]^T \in \mathbb{C}^N \tag{4}$$

Figure 6:
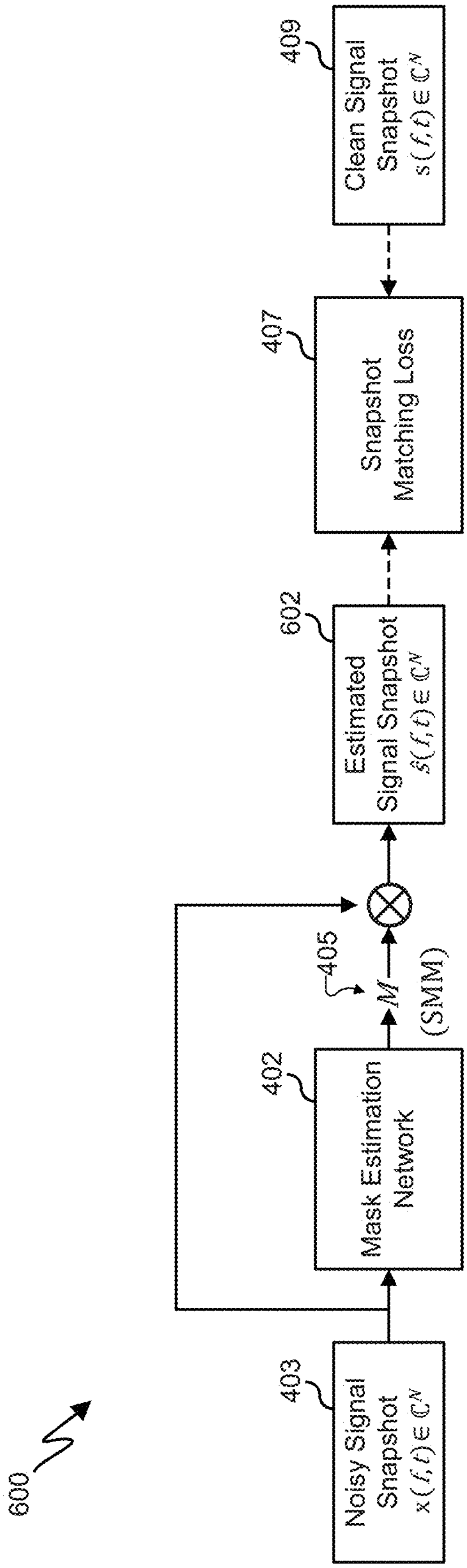
FIG. 6 illustrates an example mask estimation model training process in accordance with this disclosure.

In various embodiments, the clean signal snapshots 409 and associated clean speech STFTs 411 are included in training data samples of a training dataset. The training dataset also includes sets of sample noisy signal STFTs 401 to be used an inputs to the mask estimation network 402, where the sample noisy signal STFTs 401 are associated with corresponding ones of the clean speech STFTs 411. During training, the SMMs 405 that are output by the mask estimation network 402 are combined with the noisy signal snapshots 403, such as via element-wise multiplication applied to all channels, and the resulting outputs are provided to a snapshot matching loss operation 407. As shown in FIG. 6, which illustrates an example mask estimation model training process 600 in accordance with this disclosure, the outputs generated by combining the SMM 405 with the noisy signal snapshots 403 include estimated signal snapshots 602.

As shown in FIGS. 4 and 6, the snapshot matching loss operation 407 receives both the clean speech snapshots 409 and the estimated signal snapshots 602, and the snapshot matching loss operation 407 reduces or minimizes the distances between the true signal snapshots 409 (given by the clean speech STFTs 409) and the estimated signal snapshots 602 (given by multiplying the SMM 405 with the noisy signal snapshots 403). Again, f and t respectively denote the frequency index and the time frame index. The minimization of the distances between the clean signal snapshots 409 and the estimated signal snapshots 602 of the SMM 405 may be expressed as follows.

$$M_s(f,t) = \underset{M\in\mathbb{C},|M|\le 1}{\operatorname{argmin}} \mathcal{L}(Mx(f,t), s(f,t)), \tag{5}$$

Here, ∀f, t, where x(f,t) is the noisy signal snapshot 402, s(f,t) is the clean signal snapshot 409, $M_s$(f,t) is the estimated SMM 405, and $\mathcal{L}$( ) is a measure of the difference between the clean speech snapshot 409 (s(f,t)) and the estimated signal snapshot 602 (ŝ(f,t)), where ŝ(f,t)=Mx(f,t). By matching the snapshots, the multichannel speech enhancement system can more accurately estimate speech PSD ($\Phi_s(f,t) \triangleq E[s(f,t)s^H(f,t)]$) by having the estimated signal snapshots 602 approximate the clean signal snapshots 409 ($\hat{s}(f,t)\hat{s}^H(f,t) \approx s(f,t)s^H(f,t)$).

The snapshot matching loss operation 407 determines an error or loss using a loss function and modifies the mask estimation network 402 based on the error or loss. That is, the snapshot matching loss operation 407 uses the loss function to calculate the error or loss associated with the estimated SMM 405 provided by the mask estimation network 402. For example, when the estimated signal snapshots created using the predicted SMM differ from ground truths, the differences can be used to calculate the loss as defined by the loss function. In various embodiments, the loss function may use any suitable measure of loss associated with outputs generated by the mask estimation network 402, such as a cross-entropy loss or a mean-squared error. In some embodiments, the loss function can be based on a combined power-law compressed mean squared error (MSE) criterion imposed on the SMM 405 and the clean speech snapshots 409, where the combined power-law compressed MSE criterion can be expressed as follows.

$$\mathcal{L}_{min} = (1-\beta)\mathcal{L}_{mag} + \beta\mathcal{L}_{complex} \tag{6}$$

Thus, in various embodiments. The loss function can thus be expressed as follows.

$$\mathcal{L}(\hat{s}(f,t), s(f,t)) = \frac{1}{N}\sum_{i=1}^{N} 0.7\left(|\hat{S}_i(f,t)|^{0.3} - |S_i(f,t)|^{0.3}\right)^2 + 0.3\||\hat{S}_i(f,t)|^{0.3} e^{j\angle\hat{S}_i(f,t)} - \||S_i(f,t)|^{0.3}|e^{j\angle S_i(f,t)}|^2 \tag{7}$$

Here, ∀f, t, where ŝ(f,t)=Mx(f,t) and thus $\hat{S}_i(f,t)=MX_i(f,t)$, for i=1, . . . , N.

It has been found that the above loss function based on the combined power-law compressed MSE can perform better than other loss functions, such as standard mean squared error and mean absolute error losses. Among other reasons, this can be due to the combined power-law compressed MSE loss function accounting for the speech time-frequency characteristics by compressing the magnitude portion to accommodate the dynamic range of the speech intensity distributions for multichannel signals (snapshot) estimation purposes. However, any other suitable loss function may be used here.

When the loss calculated by the loss function is larger than desired, the parameters of the mask estimation network 402 can be adjusted. Once adjusted, the same or additional training data can be provided to the mask estimation network 402, and additional outputs (estimated signal snapshots 602 created from the combination of output SMMs 405 and the noisy signal snapshots 403) can be compared to the ground truths (clean signal snapshots 409) so that additional losses can be determined using the loss function. Over time, the mask estimation network produces more accurate outputs that more closely match the ground truths, and the measured loss becomes less. Once the measured loss drops below a specified threshold, the training of the mask estimation network 402 can be completed. Unlike existing approaches that only use information for a single selected reference channel as the target during training by matching an estimated speech mask with an ideal mask computed from clean and noisy speech signals from the single channel (the rationale being that the remaining channels are considered redundant), the training of the mask estimation network 402 of this disclosure may consider all audio channels to be equally important for training the network to generate the SMM 405, resulting in more accurate and substantially increased noise reduction.

Although FIG. 6 illustrates one example of a mask estimation model training process 600, various changes may be made to FIG. 6. For example, various components and functions in FIG. 6 may be combined, further subdivided, rearranged, replicated, or omitted according to particular needs. Also, one or more additional components and functions may be included if needed or desired.

Figure 7:
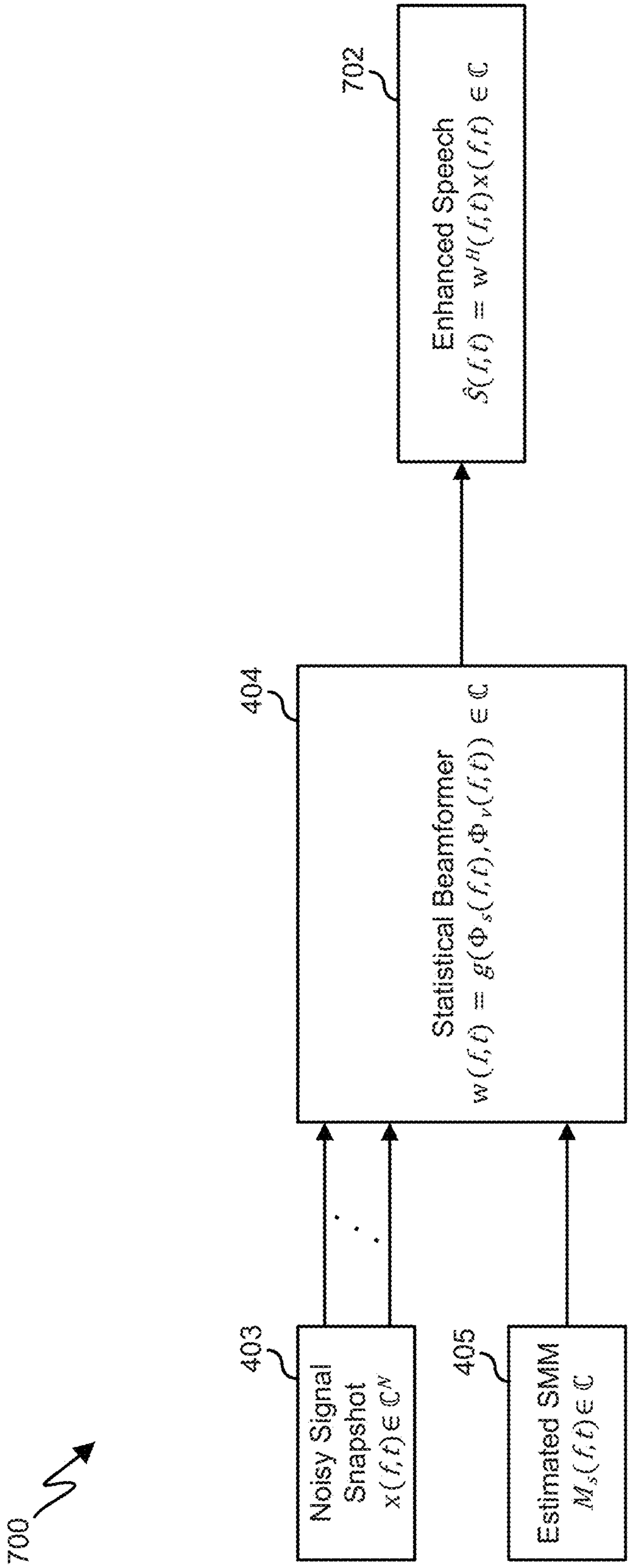
FIG. 7 illustrates an example audio signal denoising process in accordance with this disclosure.

Referring again to FIG. 4, during inferencing, the trained mask estimation network 402 outputs the estimated speech T-F mask (SMM) 405, which is provided to a statistical beamformer 404 to update signal PSD matrices of the statistical beamformer 404. The updated signal PSD matrices are used to obtain filter weights to be applied to the noisy input signals in order to denoise the noisy input signals and obtain enhanced or clean speech signals. As also shown in FIG. 7, which illustrates an example audio signal denoising process 700 in accordance with this disclosure, the noisy signal snapshot 403 and the estimated SMM 405 output by the mask estimation network 402 are provided to the statistical beamformer 404. This disclosure provides SMM-based PSD update schemes for obtaining beamforming filter weights to be applied to noisy signals for suppressing noise. In some cases, the beamforming filter weights can be expressed as follows.

$$w(f,t) = g(\Phi_s(f,t), \Phi_v(f,t)) \in \mathbb{C}^N \tag{8}$$

Here, g is a closed-form formula for computing the beamforming filter coefficients, and $\Phi_s$(f,t) and $\Phi_v$(f,t) are the speech and noise PSD estimates. The SMM 405 provided by the mask estimation network 402 is used to perform both an SMM-based speech PSD matrix update and an SMM-based noise PSD matrix update. In some cases, the SMM-based speech PSD matrix update can be expressed as follows.

$$\Phi_s(f,t) = \lambda_s\Phi_s(f,t-1) + \hat{s}(f,t)\hat{s}^H(f,t) = \lambda_s\Phi_s(f,t-1) + |M_s(f,t)|^2 x(f,t)x^H(f,t) \tag{9}$$

Also, in some cases, the SMM-based noise PSD matrix update can be expressed as follows.

$$\Phi_v(f,t) = \lambda_v\Phi_v(f,t-1) + \left(1 - |M_s(f,t)|^2\right)x(f,t)x^H(f,t) \tag{10}$$

Here, $\lambda_s$, $\lambda_y \in (0,1]$ are forgetting factors to control the smoothness of speech and noise PSD estimates, respectively.

As shown above, the beamforming filter weights w(f,t) may be determined based on the speech PSD estimate $\Phi_s$(f,t) and the noise PSD estimate $\varphi_v$(f,t), where the speech and noise PSD estimates are both updated using the SMM 405 ($M_s$(f,t)) provided by the mask estimation network 402. Once the filter weights w(f,t) are determined, the filter weights w(f,t) are applied to the noisy signals provided in the noisy signal snapshot 403 to obtain enhanced speech signals 702. In some cases, the application of the filter weights to the noisy signals to obtain the enhanced speech signals 702 can be expressed as follows.

$$\hat{S}(f,t) = w^H(f,t)x(f,t) \in \mathbb{C}^N \tag{11}$$

Once the enhanced speech signals 702 are obtained, the enhanced speech signals 702 can be converted back to a time domain and provided as a system output to be used for other downstream device and/or application processes, such as transmitting the enhanced speech signals 702 to an audio output device or providing the enhanced speech signals 702 to other applications (like a voice assistant and its related processes).

Although FIG. 7 illustrates one example of an audio signal denoising process 700, various changes may be made to FIG. 7. For example, various components and functions in FIG. 7 may be combined, further subdivided, rearranged, replicated, or omitted according to particular needs. Also, one or more additional components and functions may be included if needed or desired. Although FIG. 4 illustrates one example of a multichannel speech enhancement architecture 400, various changes may be made to FIG. 4. For instance, various components and functions in FIG. 4 may be combined, further subdivided, rearranged, replicated, or omitted according to particular needs. Also, one or more additional components and functions may be included if needed or desired.

Although the mask estimation network 402 is described above as having a DNN model architecture, the SMM framework and training processes of this disclosure can adopt various architectures for the T-F mask estimation operation, such as various convolutional neural network (CNN) architectures, recurrent neural network (RNN) architectures, U-NET architectures, RESNET architectures, transformer architectures, etc., to allow for fitting different device specifications. Additionally, the SMM-based PSD update processes of this disclosure can be utilized by any statistical beamforming algorithms that operate in the T-F domain, such as a multichannel Wiener filter (MWF) beamformer, a minimum-variance-distortionless-response (MVDR) beamformer, etc.

It should be noted that the functions shown in FIG. 4 through 7 or described above can be implemented in an electronic device 101, 102, 104, server 106, or other device(s) in any suitable manner. For example, in some embodiments, at least some of the functions shown in FIG. 4 through 7 or described above can be implemented or supported using one or more software applications or other software instructions that are executed by the processor 120 of the electronic device 101, 102, 104, server 106, or other device(s). In other embodiments, at least some of the functions shown in FIG. 4 through 7 or described above can be implemented or supported using dedicated hardware components. In general, the functions shown in FIG. 4 through 7 or described above can be performed using any suitable hardware or any suitable combination of hardware and software/firmware instructions. Also, the functions shown in FIG. 4 through 7 or described above can be performed by a single device or by multiple devices. For instance, the server 106 might be used to train the mask estimation network 402, such as based on the training process shown and described with respect to FIGS. 4 through 6. The server 106 could deploy the trained mask estimation network 402 to one or more other devices (such as the electronic device 101) for use, such as to perform SMM predications based on received audio signals, to perform PSD matrices updates to obtain beamforming filter weights, and to denoise the audio signals using the obtained beamforming filter weights as shown and described with respect to FIGS. 4, 5, and 7.

Figure 8:
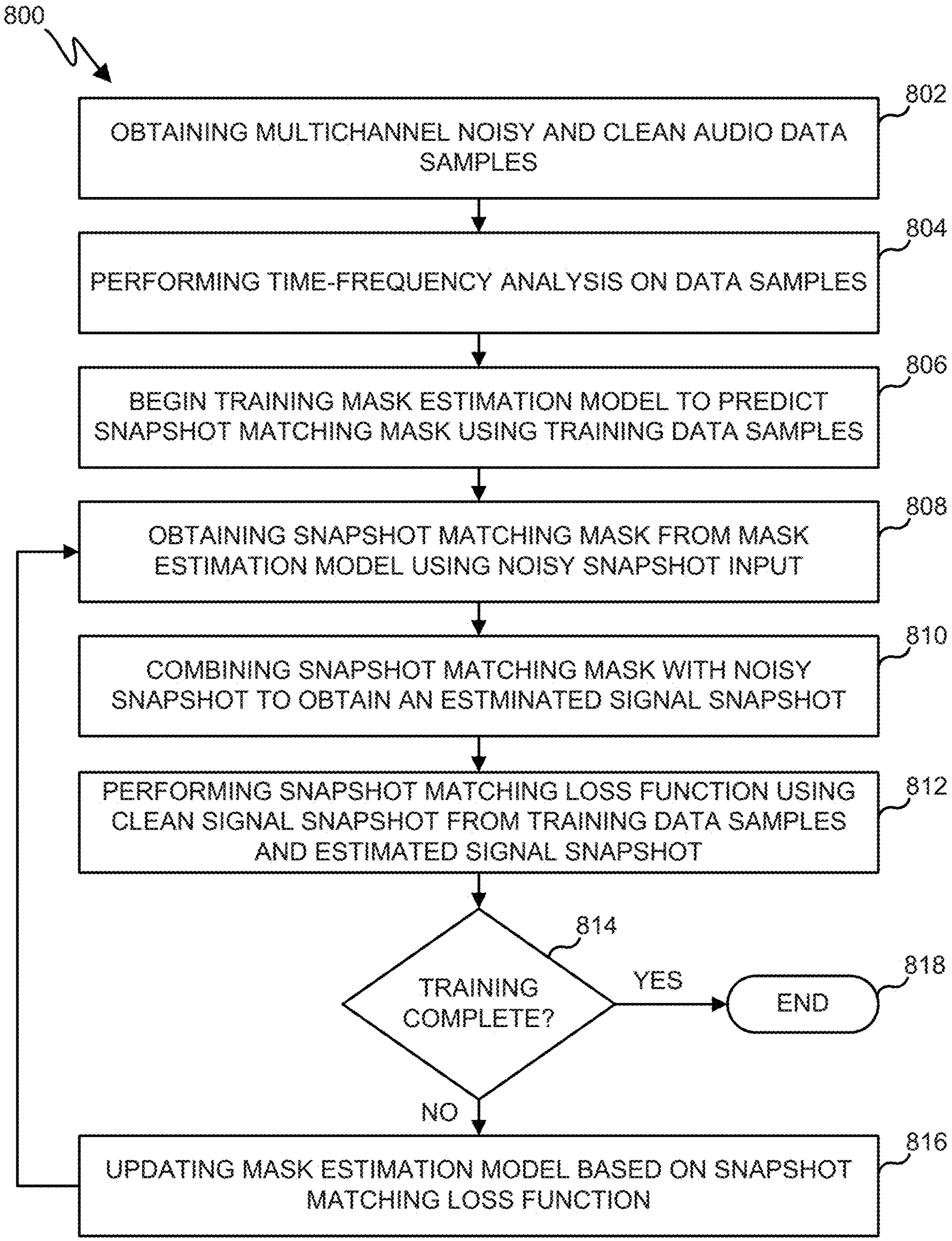
FIG. 8 illustrates an example method for training a mask estimation model in accordance with this disclosure.

FIG. 8 illustrates an example method 800 for training a mask estimation model in accordance with this disclosure. For ease of explanation, the method 800 shown in FIG. 8 is described as being performed using the server 106 in the network configuration 100 of FIG. 1. As a particular example, the method 800 can be executed on the server 106 in the network configuration 100 of FIG. 1, and one or more trained machine learning models (such as a trained mask estimation model 302 and/or a trained mask estimation network 402) can be deployed to a client electronic device 101 for use. However, the method 800 may be used with any other suitable device(s), such as the electronic device 101, and in any other suitable system(s).

As shown in FIG. 8, at block 802, noisy and clean audio data samples are obtained for supervised learning purposes to train the mask estimation model. The data samples can be obtained in any suitable manner, such as by recording real-world audio using a target device, using some room acoustic simulation software to synthesize data, or using other methods. At block 804, a time-frequency analysis is performed on the data samples to transform the data samples from a time domain into spectral-temporal representations. This may include, for example, the processor 120 of the server 106 performing a time-frequency operation on the data samples, such as STFT, MelSpectrogram, MFCC, and/or other time-frequency operations.

At block 806, the mask estimation model training using the training data samples begins. As described in this disclosure, the mask estimation model is trained to accurately predict a snapshot matching mask (SMM) that is used during deployment to update beamforming power spectral density (PSD) matrices in order to obtain beamforming weights for use in enhancing or cleaning noisy audio signals. At block 808, a snapshot matching mask is obtained from the mask estimation model using a noisy snapshot as input. This may include, for example, the processor 120 of the server 106 executing the untrained mask estimation model to predict an SMM from the noisy training audio samples, an example of which is described above with respect to FIGS. 4 through 6.

At block 810, the SMM output by the mask estimation model is combined with the noisy snapshot audio signals used to create the SMM in order to obtain an estimated signal snapshot. This may include, for example, the processor 120 of the server 106 performing element-wise complex multiplication that is applied to all channels using the SMM and the noisy signals, an example of which is described above with respect to FIGS. 4 through 6. At block 812, a snapshot matching loss operation is performed using a clean signal snapshot from the training data samples and the estimated signal snapshot that was obtained at block 810. This may include, for example, the processor 120 of the server 106 performing a matching loss function, such as the matching loss function 407, using a suitable measure of loss associated with outputs generated by the mask estimation network 402. The matching loss function 407 can use any suitable loss(es), such as a cross-entropy loss, a mean-squared error, or a combined power-law compressed MSE criterion, an example of which is described above with respect to FIGS. 4 through 6. The snapshot matching loss operation reduces or minimizes the distances between the true signal snapshots and the estimated signal snapshots.

At decision block 814, it is determined whether training of the mask estimation model is complete, such as based on whether the measured loss is below a threshold. If not, the method 800 moves to block 816. At block 816, the mask estimation model is updated based on the results of the snapshot matching loss function. This may include, for example, the processor 120 of the server 106 modifying the mask estimation model based on the calculated error or loss associated with the estimated SMM provided by the mask estimation model, an example of which is described above with respect to FIGS. 4 through 6. For example, when the estimated signal snapshots created using the predicted SMM differ from the ground truths, the differences can be used to calculate the loss as defined by the loss function. When the loss calculated by the loss function is larger than desired, the parameters of the mask estimation model can be adjusted. Once adjusted, the method 800 moves back to block 808 to continue training the mask estimation model using the training data samples. The same or additional training data can be provided to the mask estimation model for further training, and additional outputs (estimated signal snapshots created from the combination of output SMMs and the noisy signal snapshots) can be compared to the ground truths (clean signal snapshots) so that additional losses can be determined using the loss function. The method 800 can include any number of training sessions so that additional losses can be determined using the loss function and the mask estimation model can be further adjusted.

Over time, the mask estimation model produces more accurate outputs that more closely match the ground truths, and the measured loss becomes less. Once the measured loss drops below a specified threshold, the training of the mask estimation model can be completed, and the process ends at block 818. Once it is determined that the training of the mask estimation model is complete, the mask estimation model can be deployed, such as to the electronic device 101. Unlike existing approaches that only use information for a single selected reference channel as the target during training by matching an estimated speech mask with an ideal mask computed from clean and noisy speech signals from the single channel, the training of the mask estimation model here may consider all microphone channels to be equally important for training the network to generate the SMM, resulting in more accurate and substantially increased noise reduction during live inferencing.

Although FIG. 8 illustrates one example of a method 800 for training a mask estimation model, various changes may be made to FIG. 8. For example, while shown as a series of steps, various steps in FIG. 8 could overlap, occur in parallel, occur in a different order, or occur any number of times (including zero times).

Figure 9:
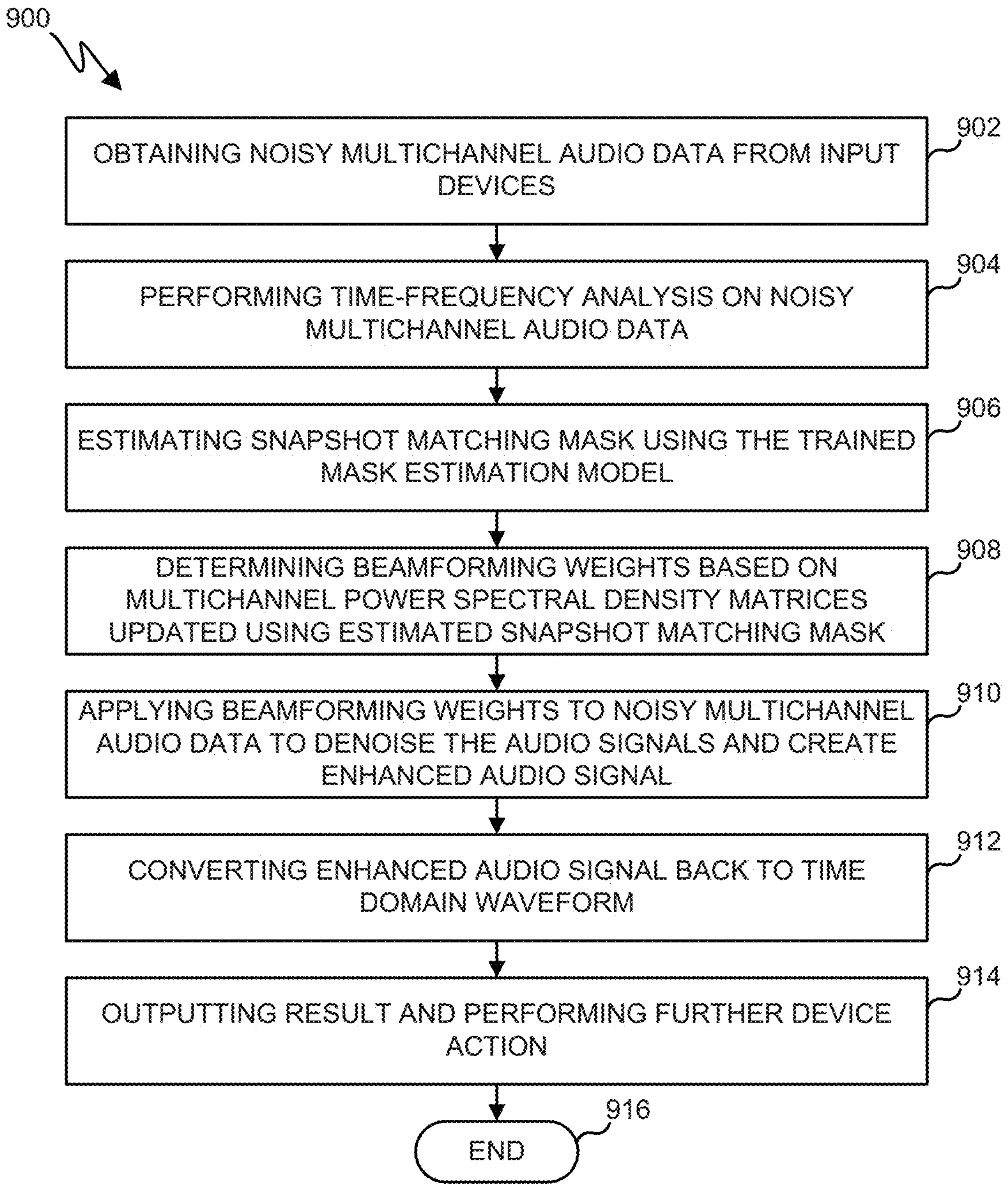
FIG. 9 illustrates an example method for audio signal denoising in accordance with this disclosure.

FIG. 9 illustrates an example method 900 for audio signal denoising in accordance with this disclosure. For ease of explanation, the method 900 shown in FIG. 9 is described as being performed using the electronic device 101 in the network configuration 100 of FIG. 1. However, the method 900 could be performed using any other suitable device(s), such as the server 106, and in any other suitable system(s).

At block 902, noisy multichannel audio data is obtained from a set of audio input devices. This may include, for example, the processor 120 of the electronic device 101 receiving noisy audio waveforms recorded by the audio input devices, which may be received during a first time window. At block 904, time-frequency analysis is performed on the noisy audio data. This may include, for example, the processor 120 of the electronic device 101 performing a time-frequency operation on the raw recorded audio data, such as STFT, MelSpectrogram, MFCC, and/or other time-frequency operations, to generate noisy time-frequency representations of the audio data, an example of which is described above with respect to FIGS. 4, 5, and 7. In various embodiments, the particular time-frequency analysis performed at block 904 matches the time-frequency analysis used during training of the mask estimation model.

At block 906, a snapshot matching mask (SMM) is estimated using at least one trained mask estimation model, such as the mask estimation model 302 and/or the mask estimation network 402. This may include, for example, the processor 120 of the electronic device 101 providing the noisy time-frequency representation as input to the mask estimation model, where the mask estimation model is trained to output the SMM. The SMM is used to predict a clean time-frequency representation of clean speech audio from the noisy time-frequency representation, an example of which is described above with respect to FIGS. 4, 5, and 7.

At block 908, beamforming weights are determined based on multichannel power spectral density (PSD) matrices, where the PSD matrices are updated using the SMM output by the mask estimation model. This may include, for example, the processor 120 of the electronic device 101 using the SMM output by the mask estimation model to update the PSD matrices and obtaining beamforming filter weights from the matrices, an example of which is described above with respect to FIGS. 4, 5, and 7. The PSD matrices can include a first PSD matrix corresponding to speech audio and a second PSD matrix corresponding to noise audio. In various embodiments, the speech audio corresponding to the first PSD matrix and the noise audio corresponding to the second PSD matrix can be from a second time window preceding the first time window in which the noisy audio inputs are received.

At block 910, the determined beamforming filter weights are applied to the noisy multichannel audio data in the T-F domain to denoise the audio signals and create an enhanced audio signal. This may include, for example, the processor 120 of the electronic device 101 using the determined beamforming weights on the noisy time-frequency representations to isolate clean speech audio from the set of noisy audio signals, an example of which is described above with respect to FIGS. 4, 5, and 7. At block 912, the enhanced audio signal obtained at block 910 is converted from the T-F domain back to the time domain. This may include, for example, the processor 120 of the electronic device 101 reversing the time-frequency operation performed at block 904.

At block 914, the resulting clean speech audio signal in the time domain is output by the speech enhancement system and can be used by one or more other devices, processes, or applications. For example, the clean speech audio could be output by an audio output device, such a local device speaker, or a remote speaker of a device that receives a transmission including the clean speech audio, such as during a voice call or message. As another example, the clean speech audio signal can be used by other machine learning processes, such as one or more voice assistant processes and/or ASR/NLU processes. For instance, the clean speech audio signal can be used to determine whether the utterance includes a device command, such as commands like calling a contact, playing music, changing a setting in an IoT device, etc. It will be understood that the speech enhancement systems and methods of this disclosure can be used in various embodiments to perform speech and audio denoising on edge devices and mobile platforms with multiple microphones, such as refrigerators, cell phones, vacuum cleaners, smart watches, AR/VR glasses, earbuds, smart TVs, etc. The speech enhancement systems and methods of this disclosure can also be used in various embodiments as pre-processing units for voice control, wake word detection, automatic speech recognition, audio anomaly detection, acoustic scene classification, and assistive listening to improve human hearing experiences in noisy environments. Thus, the speech enhancement systems and methods of this disclosure can be beneficial for various intelligent applications. The speech enhancement systems and methods of this disclosure have been found to provide improved speech quality across different numbers of microphones as compared to existing approaches, including other mask-based approaches. The method 900 ends at block 916.

Although FIG. 9 illustrates one example of a method 900 for audio signal denoising, various changes may be made to FIG. 9. For example, while shown as a series of steps, various steps in FIG. 9 could overlap, occur in parallel, occur in a different order, or occur any number of times (including zero times).

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

receiving, during a first time window, a set of noisy audio signals from a plurality of audio input devices;

generating a noisy time-frequency representation based on the set of noisy audio signals;

providing the noisy time-frequency representation as an input to a mask estimation model trained to output a mask used to predict a clean time-frequency representation of clean speech audio from the noisy time-frequency representation, wherein, to train the mask estimation model, differences in magnitude and phase of clean time-frequency representations and predicted clean time-frequency representations are minimized;

determining beamforming filter weights based on the mask, wherein the beamforming filter weights include a first power spectral density (PSD) matrix and a second PSD matrix, and wherein the mask is used to update the first PSD matrix and the second PSD matrix using forgetting factors that control speech and noise PSD estimates;

applying the beamforming filter weights to the noisy time-frequency representation to isolate the clean speech audio from the set of noisy audio signals; and outputting the clean speech audio.

2. The method of claim 1, wherein the first PSD matrix corresponds to speech audio and the second PSD matrix corresponds to noise audio.

3. The method of claim 2, wherein the speech audio corresponding to the first PSD matrix and the noise audio corresponding to the second PSD matrix are from a second time window preceding the first time window.

4. The method of claim 2, wherein the first PSD matrix and the second PSD matrix are updated using the mask via a statistical beamformer.

5. The method of claim 1, wherein:

generating the noisy time-frequency representation comprises performing a time-frequency analysis on the set of noisy audio signals, wherein the set of noisy audio signals is in a time domain; and the method further comprises converting the clean speech audio back to the time domain prior to outputting the clean speech audio.

6. The method of claim 1, wherein:

the mask estimation model is trained using a training dataset comprising sets of sample noisy audio signals;

the sets of sample noisy audio signals are associated with the clean time-frequency representations of speech audio in the sets of sample noisy audio signals and noisy time-frequency representations of the sets of sample noisy audio signals;

the differences in magnitude and phase of the clean time-frequency representations and the predicted clean time-frequency representations are minimized using a combined power-law compressed mean squared error criterion imposed on the predicted clean time-frequency representations and the clean time-frequency representations; and the clean time-frequency representations and the predicted clean time-frequency representations are determined via an application of masks output by the mask estimation model to the noisy time-frequency representations.

7. The method of claim 1, wherein the mask estimation model is trained to output the mask with a magnitude within a unit circle on a complex plane.

8. An electronic device comprising:

at least one processing device configured to:

receive, during a first time window, a set of noisy audio signals from a plurality of audio input devices;

generate a noisy time-frequency representation based on the set of noisy audio signals;

provide the noisy time-frequency representation as an input to a mask estimation model trained to output a mask used to predict a clean time-frequency representation of clean speech audio from the noisy time-frequency representation, wherein, to train the mask estimation model, differences in magnitude and phase of clean time-frequency representations and predicted clean time-frequency representations are minimized;

determine beamforming filter weights based on the mask, wherein the beamforming filter weights include a first power spectral density (PSD) matrix and a second PSD matrix, and wherein the mask is used to update the first PSD matrix and the second PSD matrix using forgetting factors that control speech and noise PSD estimates;

apply the beamforming filter weights to the noisy time-frequency representation to isolate the clean speech audio from the set of noisy audio signals; and output the clean speech audio.

9. The electronic device of claim 8, wherein the first PSD matrix corresponds to speech audio and the second PSD matrix corresponds to noise audio.

10. The electronic device of claim 9, wherein the speech audio corresponding to the first PSD matrix and the noise audio corresponding to the second PSD matrix are from a second time window preceding the first time window.

11. The electronic device of claim 9, wherein the first PSD matrix and the second PSD matrix are updated using the mask via a statistical beamformer.

12. The electronic device of claim 8, wherein:

to generate the noisy time-frequency representation, the at least one processing device is configured to perform a time-frequency analysis on the set of noisy audio signals, wherein the set of noisy audio signals is in a time domain; and the at least one processing device is further configured to convert the clean speech audio back to the time domain prior to the output of the clean speech audio.

13. The electronic device of claim 8, wherein:

the mask estimation model is trained using a training dataset comprising sets of sample noisy audio signals;

the sets of sample noisy audio signals are associated with the clean time-frequency representations of speech audio in the sets of sample noisy audio signals and noisy time-frequency representations of the sets of sample noisy audio signals;

the differences in magnitude and phase of the clean time-frequency representations and the predicted clean time-frequency representations are minimized using a combined power-law compressed mean squared error criterion imposed on the predicted clean time-frequency representations and the clean time-frequency representations; and the clean time-frequency representations and the predicted clean time-frequency representations are determined via an application of masks output by the mask estimation model to the noisy time-frequency representations.

14. The electronic device of claim 8, wherein the mask estimation model is trained to output the mask with a magnitude within a unit circle on a complex plane.

15. A non-transitory machine-readable medium containing instructions that when executed cause at least one processor of an electronic device to:

receive, during a first time window, a set of noisy audio signals from a plurality of audio input devices;

generate a noisy time-frequency representation based on the set of noisy audio signals;

provide the noisy time-frequency representation as an input to a mask estimation model trained to output a mask used to predict a clean time-frequency representation of clean speech audio from the noisy time-frequency representation, wherein, to train the mask estimation model, differences in magnitude and phase of clean time-frequency representations and predicted clean time-frequency representations are minimized;

determine beamforming filter weights based on the mask, wherein the beamforming filter weights include a first power spectral density (PSD) matrix and a second PSD matrix, and wherein the mask is used to update the first PSD matrix and the second PSD matrix using forgetting factors that control speech and noise PSD estimates;

apply the beamforming filter weights to the noisy time-frequency representation to isolate the clean speech audio from the set of noisy audio signals; and output the clean speech audio.

16. The non-transitory machine-readable medium of claim 15, wherein the first PSD matrix corresponds to speech audio and the second PSD matrix corresponds to noise audio.

17. The non-transitory machine-readable medium of claim 16, wherein the speech audio corresponding to the first PSD matrix and the noise audio corresponding to the second PSD matrix are from a second time window preceding the first time window.

18. The non-transitory machine-readable medium of claim 16, wherein the first PSD matrix and the second PSD matrix are updated using the mask via a statistical beamformer.

19. The non-transitory machine-readable medium of claim 15, wherein:

the instructions that when executed cause the at least one processor to generate the noisy time-frequency representation comprise instructions that when executed cause the at least one processor to perform a time-frequency analysis on the set of noisy audio signals, wherein the set of noisy audio signals is in a time domain; and the non-transitory machine-readable medium further contains instructions that when executed cause the at least one processor to convert the clean speech audio back to the time domain prior to the output of the clean speech audio.

20. The non-transitory machine-readable medium of claim 15, wherein:

the mask estimation model is trained using a training dataset comprising sets of sample noisy audio signals;

the sets of sample noisy audio signals are associated with the clean time-frequency representations of speech audio in the sets of sample noisy audio signals and noisy time-frequency representations of the sets of sample noisy audio signals;

the differences in magnitude and phase of the clean time-frequency representations and the predicted clean time-frequency representations are minimized using a combined power-law compressed mean squared error criterion imposed on the predicted clean time-frequency representations and the clean time-frequency representations; and the clean time-frequency representations and the predicted clean time-frequency representations are determined via an application of masks output by the mask estimation model to the noisy time-frequency representations.

* * * * *